(12) United States Patent
Minato et al.

(10) Patent No.: US 11,255,451 B2
(45) Date of Patent: Feb. 22, 2022

(54) SEISMICALLY ACTIVATED GAS SHUT-OFF VALVE WITH WEIGHT DISPLACED TRIGGER MECHANISM

(71) Applicant: LITTLE FIREFIGHTER CORPORATION, Santa Ana, CA (US)

(72) Inventors: Tod Minato, Huntington Beach, CA (US); Ezra Kent, Huntington Beach, CA (US); Rafael Quintana, Anaheim, CA (US)

(73) Assignee: VANCE. LP, Huntingto N Beach, CA (US)

( * ) Notice: Subject to any disclaimer, the term of this patent is extended or adjusted under 35 U.S.C. 154(b) by 48 days.

(21) Appl. No.: 16/237,042

(22) Filed: Dec. 31, 2018

(65) Prior Publication Data

US 2020/0208751 A1 Jul. 2, 2020

(51) Int. Cl.
*F16K 17/36* (2006.01)
*F16K 31/44* (2006.01)
*F16K 1/30* (2006.01)

(52) U.S. Cl.
CPC ............ *F16K 17/363* (2013.01); *F16K 1/305* (2013.01); *F16K 31/44* (2013.01)

(58) Field of Classification Search
CPC .......................... F16K 17/363; Y10T 137/0777
USPC .......................................................... 251/74
See application file for complete search history.

(56) References Cited

U.S. PATENT DOCUMENTS

| | | | | |
|---|---|---|---|---|
| 4,603,591 A | * | 8/1986 | Sibley | F16K 17/363 137/38 |
| 4,844,113 A | * | 7/1989 | Jones | F16K 17/363 137/39 |
| 5,113,901 A | * | 5/1992 | Young | E03F 7/00 137/554 |
| 5,115,829 A | * | 5/1992 | Franzke | F16K 17/363 137/38 |
| 5,209,454 A | * | 5/1993 | Engdahl | F16K 17/363 137/38 |
| 5,449,015 A | * | 9/1995 | Petkovic | F16K 17/36 137/38 |
| 5,823,223 A | * | 10/1998 | Franklin | F16K 17/366 137/38 |
| 5,894,856 A | * | 4/1999 | Swenson | F16K 17/363 137/38 |
| 6,394,122 B1 | * | 5/2002 | Sibley | F16K 17/363 137/15.01 |

(Continued)

*Primary Examiner* — Reinaldo Sanchez-Medina
*Assistant Examiner* — Nicole Gardner
(74) *Attorney, Agent, or Firm* — Innovation Capital Law Group, LLP; Vic Lin

(57) ABSTRACT

A gas shut-off valve assembly designed to automatically close gas flow in a gas conduit in response to a seismic vibration comprises a door which may be parallel to a port in the conduit and a weight above the door. In some embodiments, the door may be mostly out of the conduit passageway and out of the gas flow allowing for improved gas flow efficiency in the normally open state. Upon sensing a seismic vibration, the weight falls from a platform onto the door causing the door to move into the conduit passageway sealing the passageway. In some embodiments, a port in the passageway is perpendicular to the door's default position in the open state. When the door closes the passageway, the door rotates ninety degrees about an axis into the second closed position to become parallel with the port.

17 Claims, 14 Drawing Sheets

(56) References Cited

U.S. PATENT DOCUMENTS

| | | | | |
|---|---|---|---|---|
| 6,926,025 B1* | 8/2005 | Sibley | ............... | F16K 17/363 |
| | | | | 137/38 |
| 7,918,239 B1* | 4/2011 | Ikegaya | ............. | F16K 17/363 |
| | | | | 137/38 |
| 9,080,680 B2* | 7/2015 | Minato | ............. | F16K 17/366 |

* cited by examiner

SEISMICALLY ACTIVATED GAS SHUT-OFF VALVE WITH WEIGHT DISPLACED TRIGGER MECHANISM

BACKGROUND OF THE INVENTION

Field of the Invention

The present invention relates to a gas shut-off valve assembly, and more particularly, a seismically activated gas shut-off valve.

Description of Prior Art and Related Information

Earthquakes frequently occur daily, and are almost ubiquitous in some areas, with individuals in those areas barely stopping their routines unless the magnitude of shaking is significant. Some earthquakes are unnoticed because they are too weak or occur in remote areas of the world. However, even small earthquakes, if located close enough to densely populated areas (for example, urban or heavily populated suburbs), can cause significant damage to foundations and utility lines running underground. In particular, gas flow lines can be extremely dangerous when seismic activity is enough to crack a line. The escaping gas can leak and trigger a chain reaction of explosions if it comes into contact with enough heat.

Various methods to shut off gas flow in conduits and pipelines in response to earthquake vibrations are known in the art. These methods generally share the common features of placing a gas valve in a section of a gas pipeline, maintaining the gas valve in an initial open position.

A conventional gas valve requires a person to manually rotate a handle which is connected to a disc inside the flow passage. The disc is by default always in the flow and when open, usually has some surface area obstructing the passage and the gas flow therethrough. When closed, the disc is rotated on an axis orthogonal to the gas flow until the flat face of the disc is perpendicular to the flow and the disc edges are abutting the gas line walls.

As can be seen, there is a need to improve on the efficiency of current gas shut-off valves which may restrict gas flow even when the valve is normally open.

BRIEF SUMMARY OF THE INVENTION

In one aspect, a seismically activated gas shut-off valve assembly is disclosed. The gas shut-off valve assembly comprises a gas flow passageway defined by a conduit wall; a port in the gas flow passageway; a platform positioned above the gas flow passageway; a door positioned below the platform; a retention mechanism retaining the door in a first position, wherein the door first position is perpendicular to the port in the gas flow passageway and normally open permitting gas to flow through the passageway; and a weight positioned in equilibrium on the platform, wherein, in response to a seismic vibration above a threshold level, the weight is displaced from equilibrium off the platform and onto the door positioned below the platform, wherein an impact from the weight on the door disengages the door from the retention mechanism, releasing the door to move about a horizontal axis and into a second position parallel to the port and sealing the port putting the valve assembly into a closed state, preventing gas flowing through the passageway.

In another aspect, a seismically activated gas shut-off valve assembly, comprises a gas flow passageway defined by a conduit wall; a port in the gas flow passageway; a platform positioned above the gas flow passageway; a door positioned below the platform; a retention mechanism retaining the door in a first position and outside an inner diameter of the conduit wall, wherein the door first position is perpendicular to the port in the gas flow passageway and normally open permitting gas to flow through the passageway; and a weight positioned in on the platform, wherein, in response to a seismic vibration above a threshold level, the weight is displaced off a front edge of the platform and onto the door positioned below the platform, wherein an impact from the weight on the door disengages the door from the retention mechanism, releasing the door to move about a horizontal axis and into a second position into the gas flow passageway sealing the port and putting the valve assembly into a closed state, preventing gas flowing through the passageway.

In yet another aspect, a seismically activated gas shut-off valve assembly comprises a gas flow passageway defined by a conduit wall; a platform positioned above the gas flow passageway; a well in the top surface of the platform; a door positioned below the platform; a retention mechanism retaining the door in a first position, wherein the door first position is normally open permitting gas to flow through the passageway; and a weight positioned in the well of the platform, wherein, in response to a seismic vibration above a threshold level, the weight is displaced from the well and off the platform and onto the door positioned below the platform, wherein an impact from the weight on the door disengages the door from the retention mechanism, releasing the door to move into a second, closed position, preventing gas flowing through the passageway.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

In general, embodiments disclose a seismically activated gas shut-off assembly that automatically closes off gas flow in a gas conduit in response to a seismic vibration to prevent undesired gas leakage. The assembly remains normally open until vibrations from seismic activity cause a weight to drop from an elevated seat, causing a door to release from an open position to a closed position sealing a port and cutting the flow of gas off through the valve. In an exemplary embodiment, the passageway for gas flow is unobstructed by any of the valve elements in the normally open state so that gas flow efficiency is improved over conventional arrangements.

Figure 1:
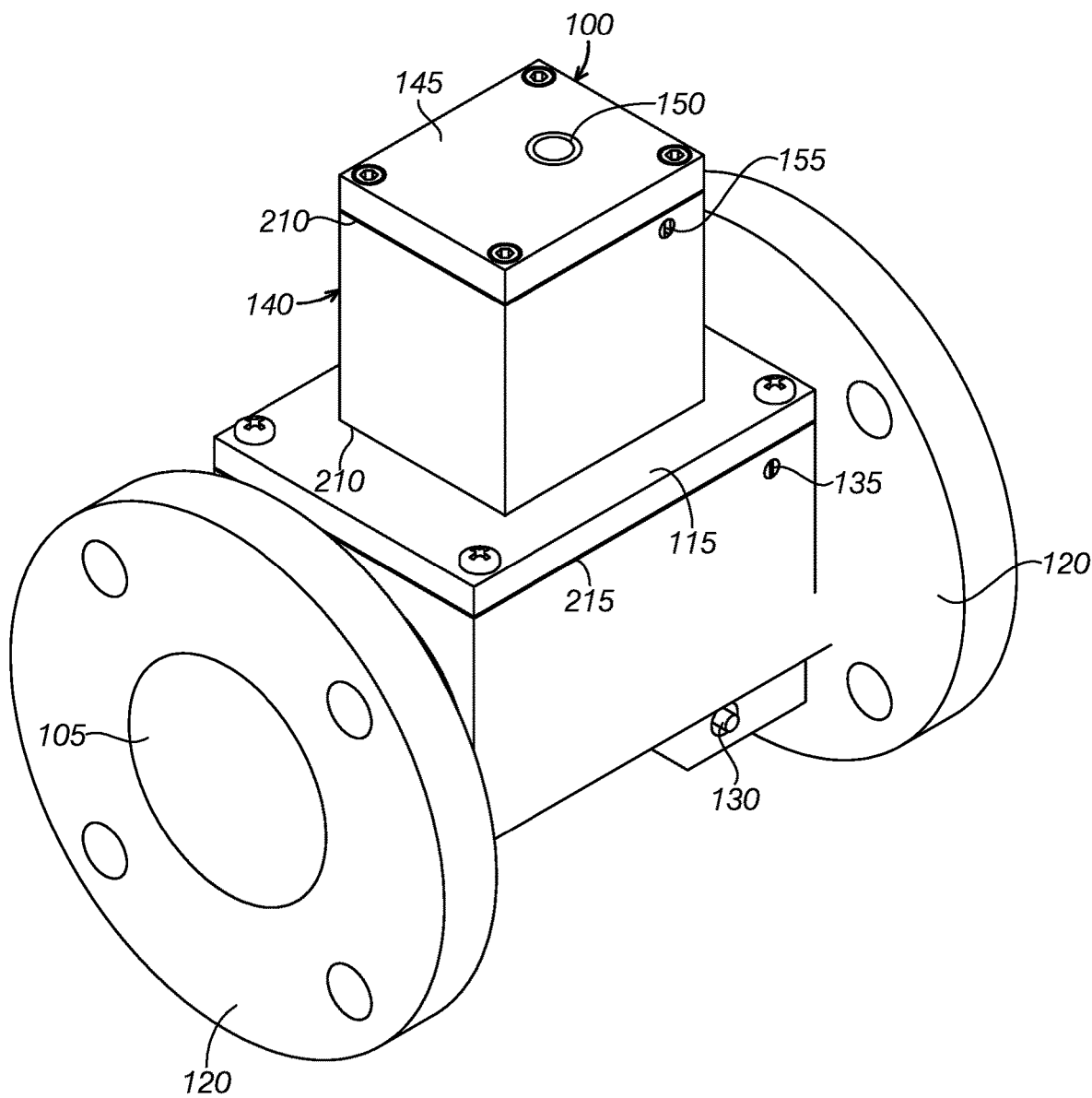
FIG. 1 is a side perspective view of a seismic valve shut-off assembly in accordance with an exemplary embodiment.
Figure 2:
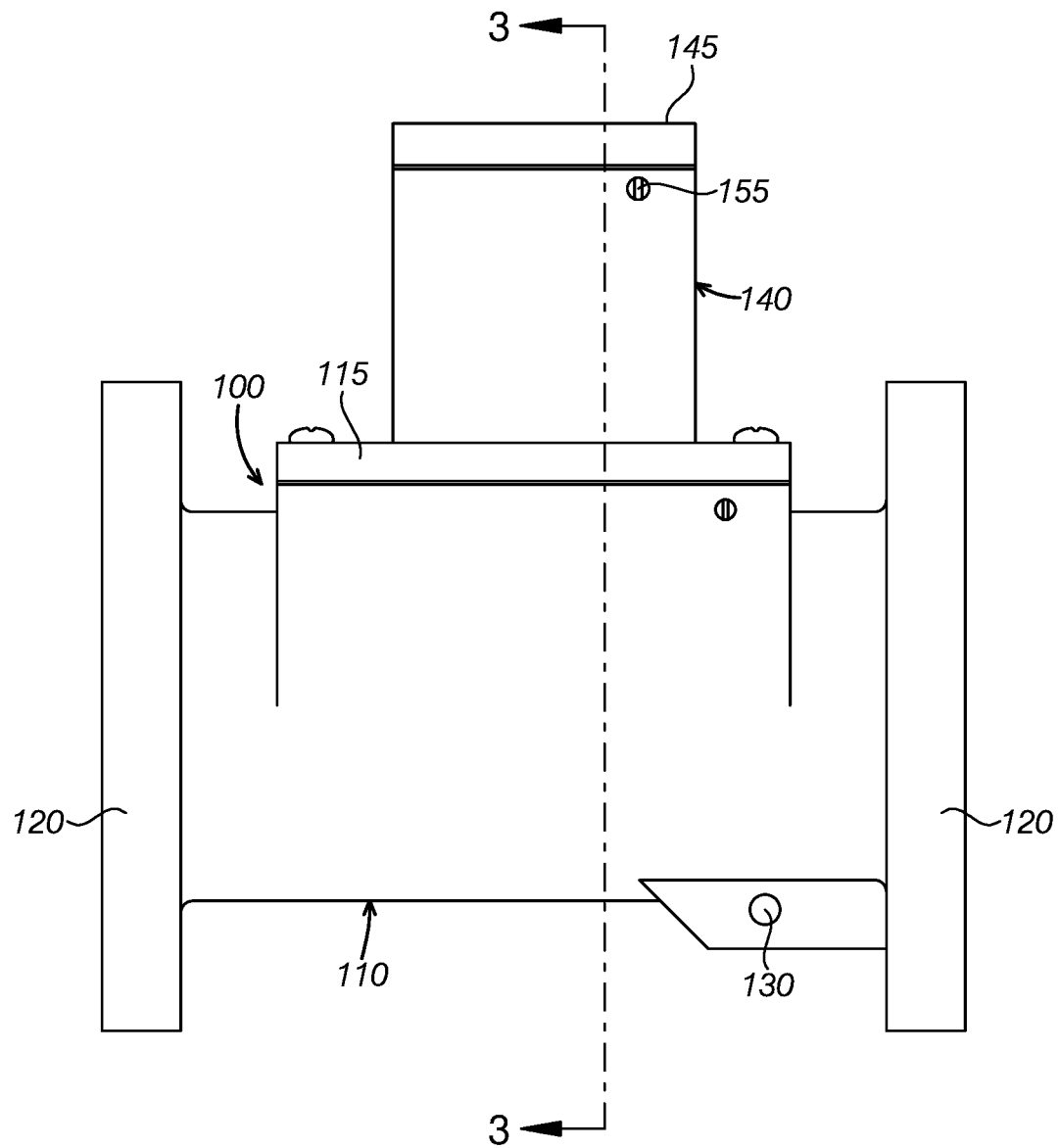
FIG. 2 is a side view of the seismic valve shut-off assembly of FIG. 1.
Figure 4:
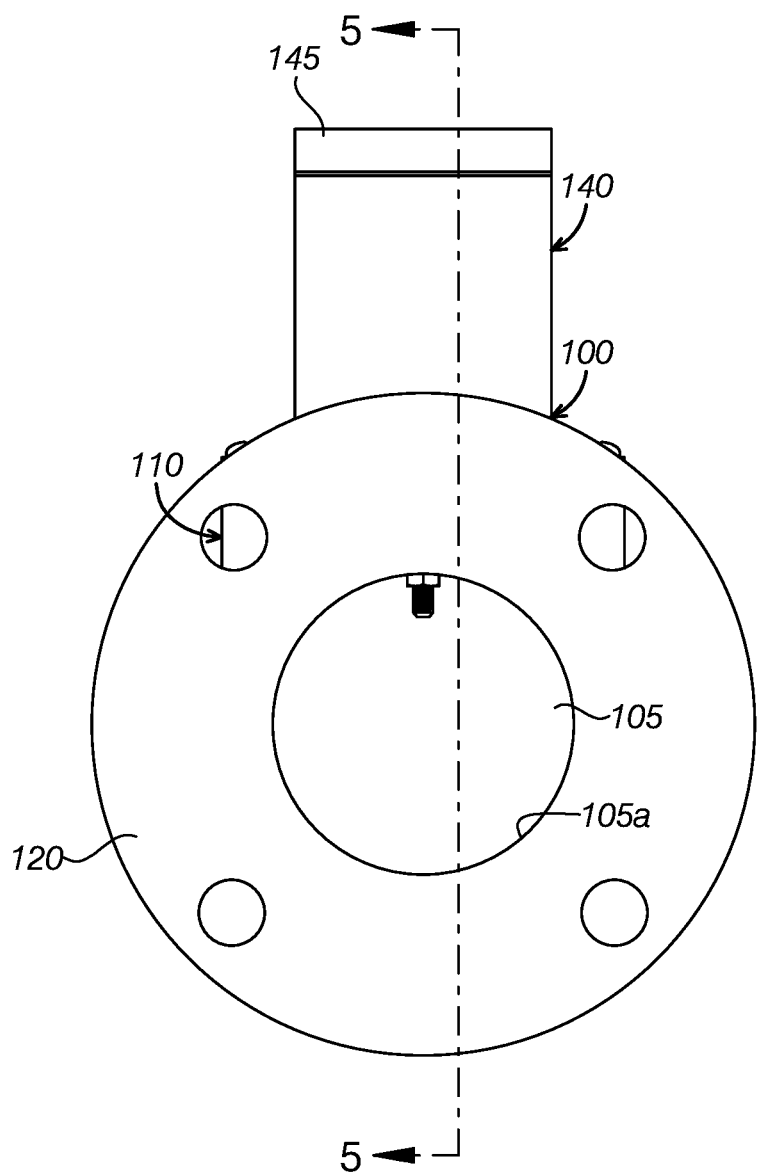
FIG. 4 is an end view of the seismic valve shut-off assembly of FIG. 1.

Referring now to FIGS. 1, 2, and 4, a seismically activated gas shut-off valve assembly 100 (sometimes referred to simply as "valve 100") is shown according to an exemplary embodiment. In FIGS. 1, 2, and 4, an exterior view of the valve 100 is shown. The valve 100 includes generally a valve housing 110. The valve housing 110 generally houses the passageway 105 for gas flow and as will be described further below, the elements for closing off gas flow. A sensor housing 140 may be positioned on top of the valve housing 110. The sensor housing 140 generally houses elements for detecting seismic activity and for triggering the shut-off mechanism. In an exemplary embodiment, flanges 120 may be connected on ends of the valve housing 110. The flanges 120 may be configured for connecting to an interrupted section of pipeline (not shown). The flanges 120 may define part of the passageway for gas flow through the pipeline of a gas conduit. As will be seen in the description below, the valve 100 may allow for unobstructed gas flow in its normally open position providing an increased efficiency in gas flux through the valve area.

Figure 9:
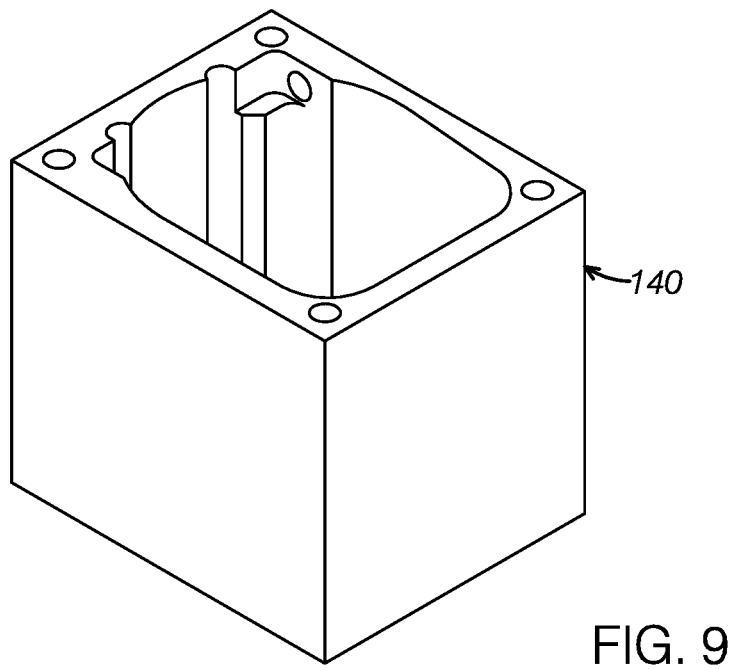
FIG. 9 is an isometric view of a sensor housing in accordance with an exemplary embodiment.
Figure 10:
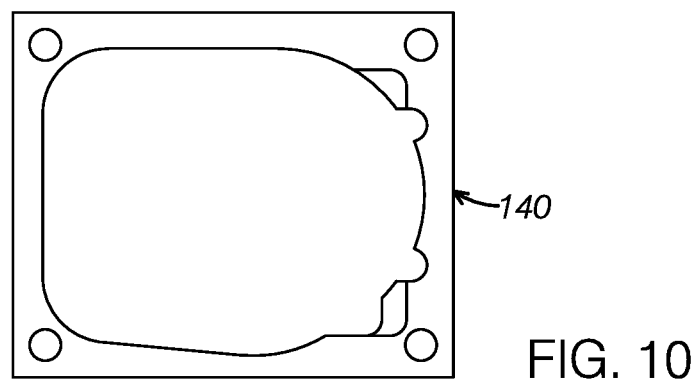
FIG. 10 is a top view of the sensor housing of FIG. 9.
Figure 11:
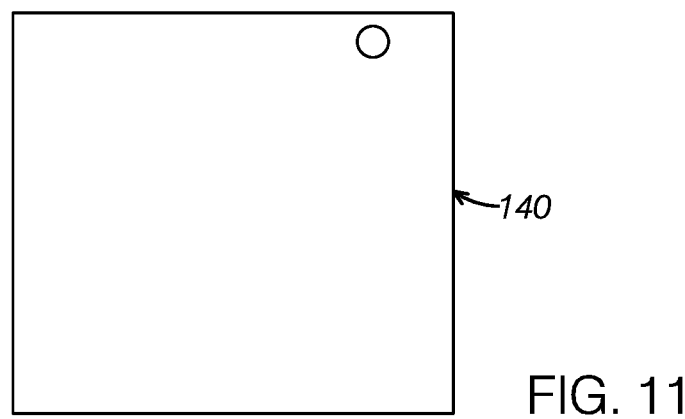
FIG. 11 is a side view of the sensor housing of FIG. 9.
Figure 12:
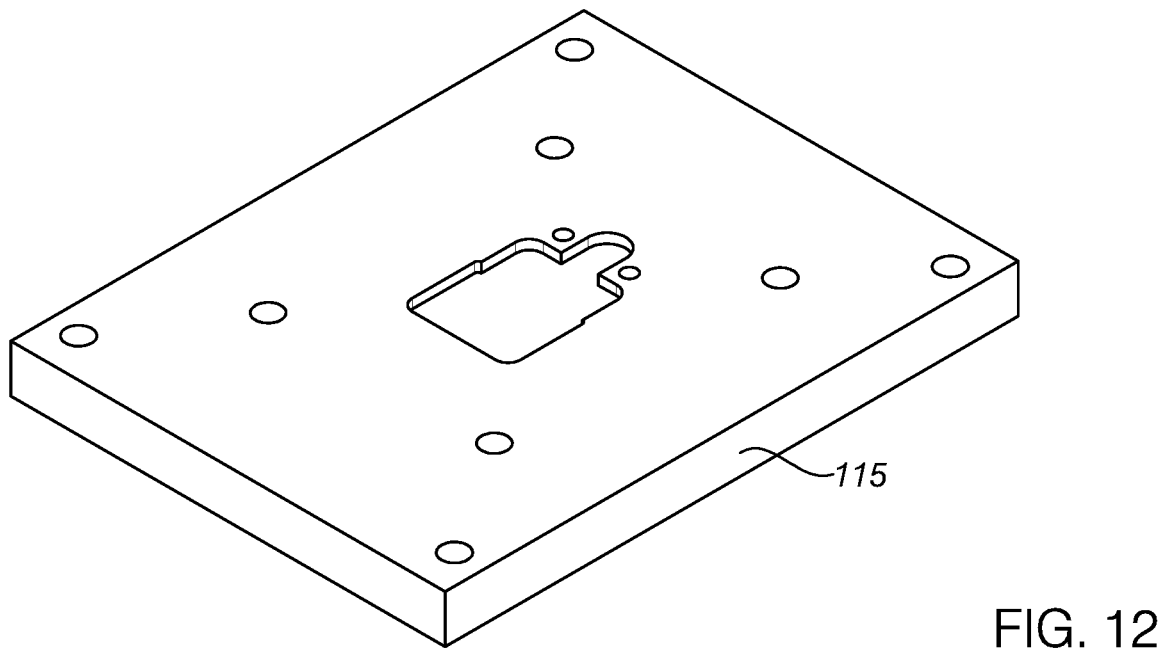
FIG. 12 is an isometric view of a valve cover in accordance with an exemplary embodiment.
Figure 13:
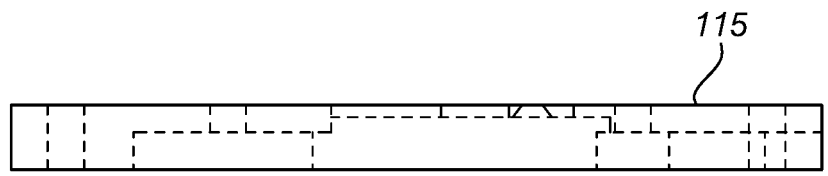
FIG. 13 is a side view of the valve cover of FIG. 12, with internal features shown in shadow lines.
Figure 14:
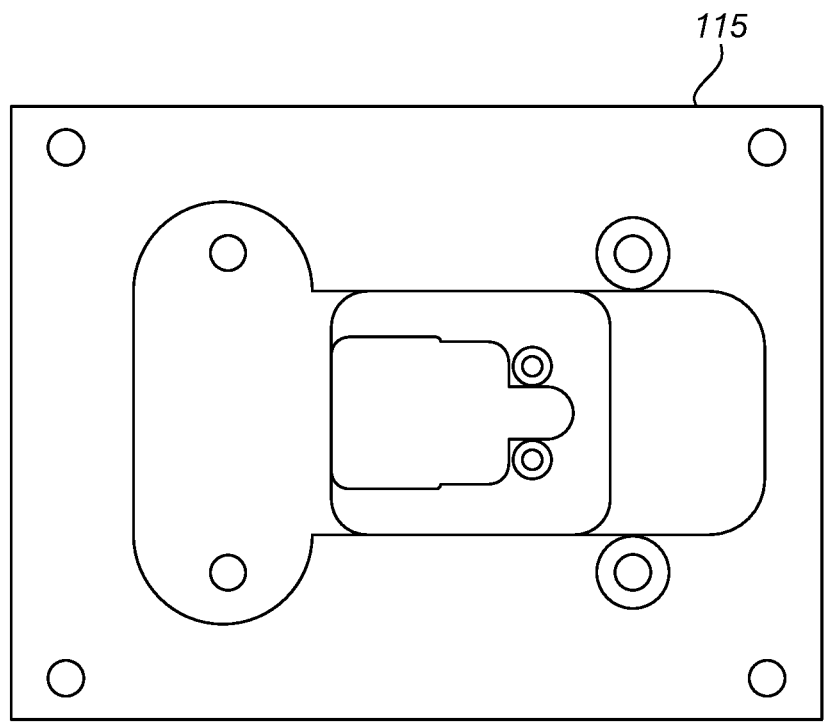
FIG. 14 is a bottom view of the valve cover of FIG. 12.
Figure 15:
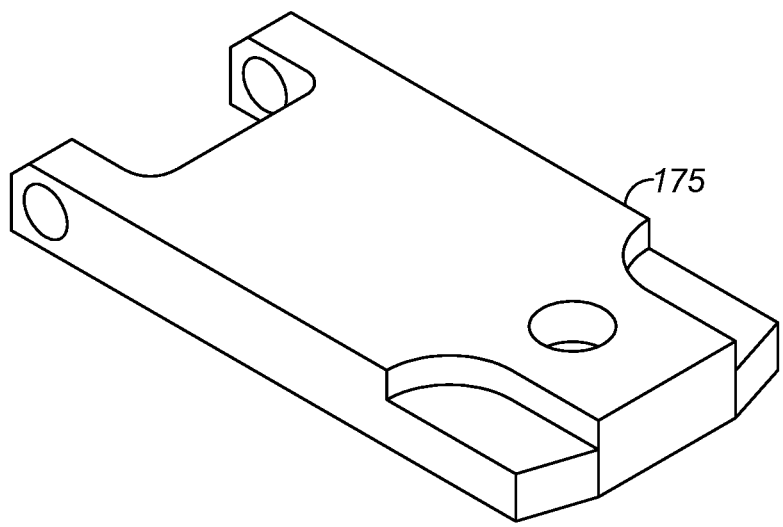
FIG. 15 is an isometric view of a flapper in accordance with an exemplary embodiment.
Figure 16:
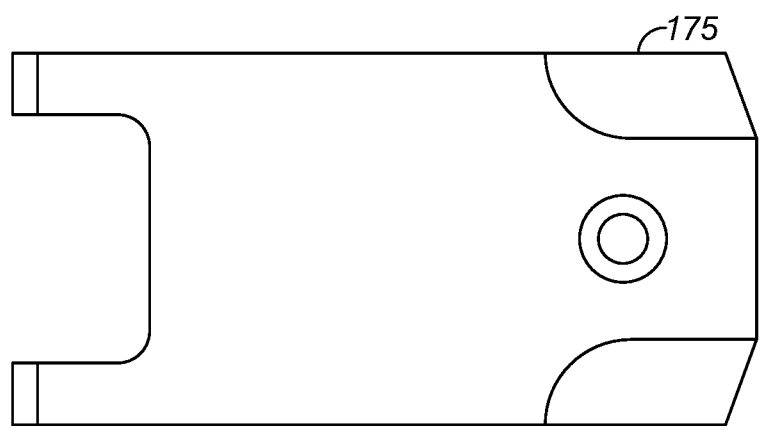
FIG. 16 is a top view of the flapper of FIG. 15.
Figure 17:
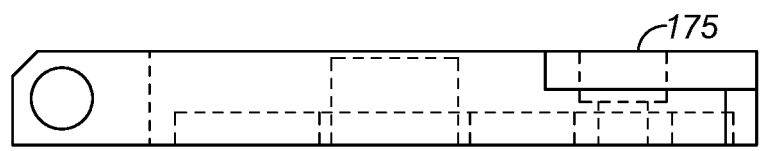
FIG. 17 is a side view of the flapper of FIG. 15, with internal features shown in shadow lines.
Figure 18:
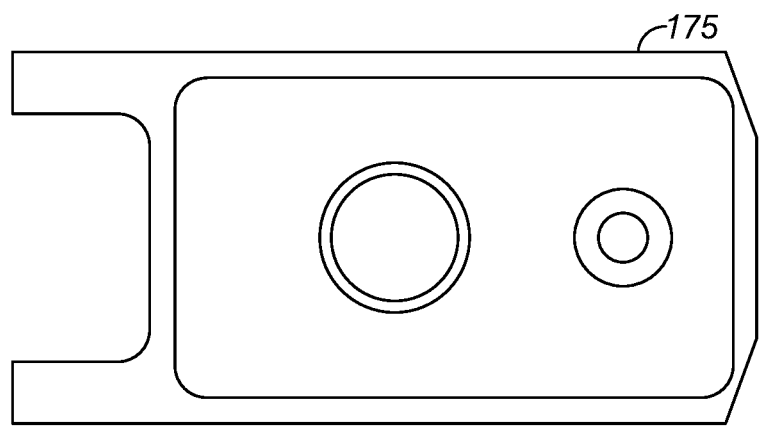
FIG. 18 is a bottom view of the flapper of FIG. 15.
Figure 19:
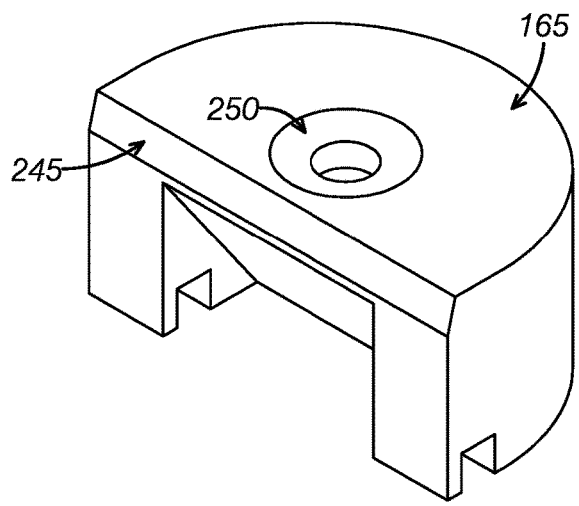
FIG. 19 is a perspective front view of a weight platform in accordance with an exemplary embodiment.
Figure 20:
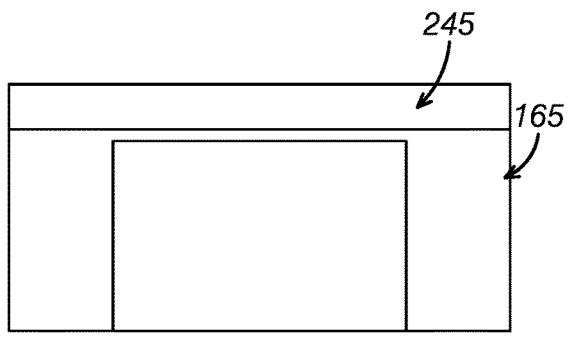
FIG. 20 s a front view of the weight platform of FIG. 19.
Figure 21:
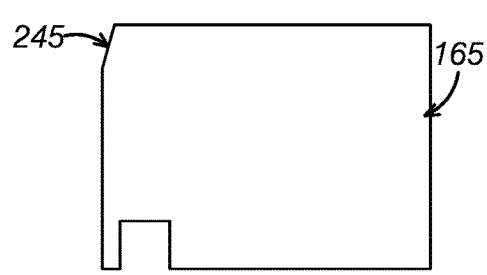
FIG. 21 is a side view of the weight platform of FIG. 19.
Figure 22:
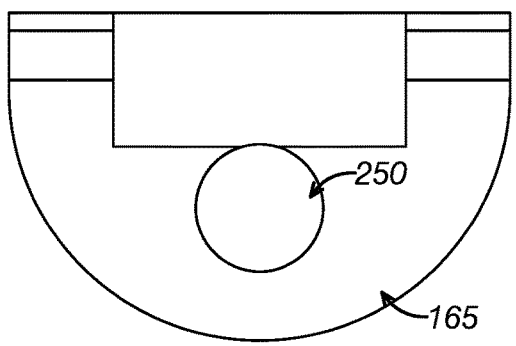
FIG. 22 is a bottom view of the weight platform of FIG. 19.
Figure 23:
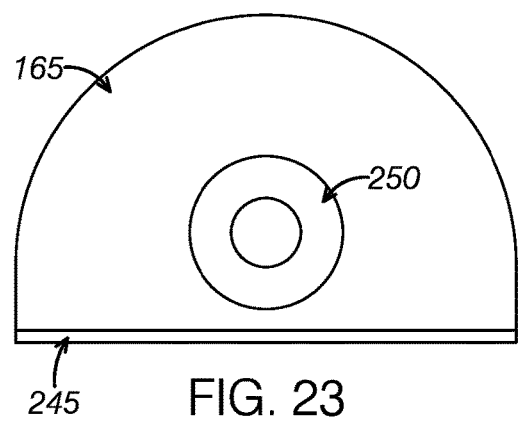
FIG. 23 is a top view of the weight platform of FIG. 19.

The valve housing 110 may be generally hollow and may include an open top sealed by a cover 115. A gasket 215 may provide a seal between the cover 115 and the top edge of the valve housing 110. In addition, a floor (not shown) of the sensor housing 140 (see also FIGS. 9-11), includes an opening leading into the interior of the valve housing 110 through an opening in cover 115 (See FIGS. 12-14). The interface between the sensor housing 140 and the cover 115 may be sealed by a sensor housing gasket 210. Another sensor housing gasket 210 may seal a sensor housing cover 145 onto the sensor housing 140. In some embodiments, a sight glass 150 may be included in the sensor housing cover 145 providing a view into the sensor housing 140 (and valve housing 110 when the valve 100 is closed).

Some embodiments may also include a relief button 130 coupled to the valve housing 110. The relief button 130 may be configured to allow the valve 100 to be reset when there is back pressure from a gas meter (not shown) to which the valve 100 is connected. The relief button 130 allows gas to bleed through a pressure release channel (not shown) to equalize pressure on both sides of the closing mechanism, thus making reset possible. Some embodiments may include a reset button 135 that as will be seen, resets the closing mechanism back to its normally open position after the valve 100 has been triggered to close. The sensor housing 140 may include an emergency shutoff shaft 155 which, may be under tension. The shutoff shaft 155 allows the user to manually trip the valve 100 (described below) if the gas to the building needs to be turned off quickly.

Figure 3:
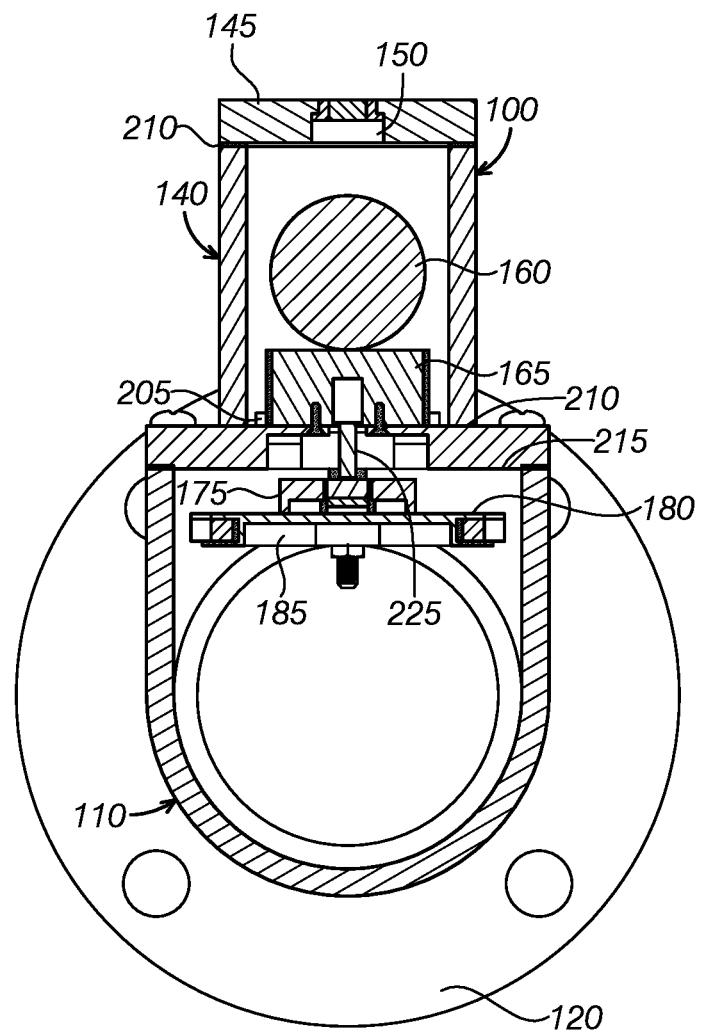
FIG. 3 is a cross-sectional end view taken along the line 3-3 of FIG. 2.
Figure 5:
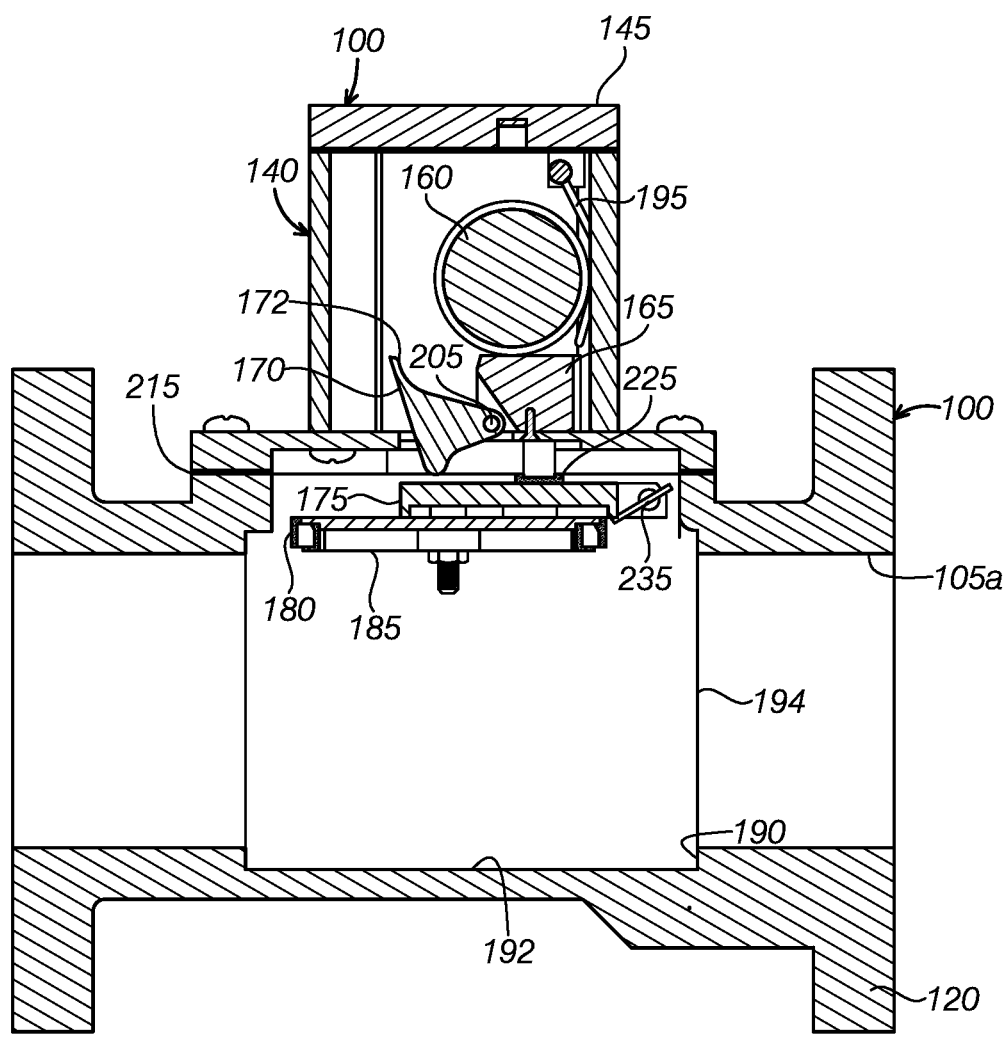
FIG. 5 is a cross-sectional side view taken along the line 5-5 of FIG. 4, showing the valve assembly in an open position.
Figure 5A:
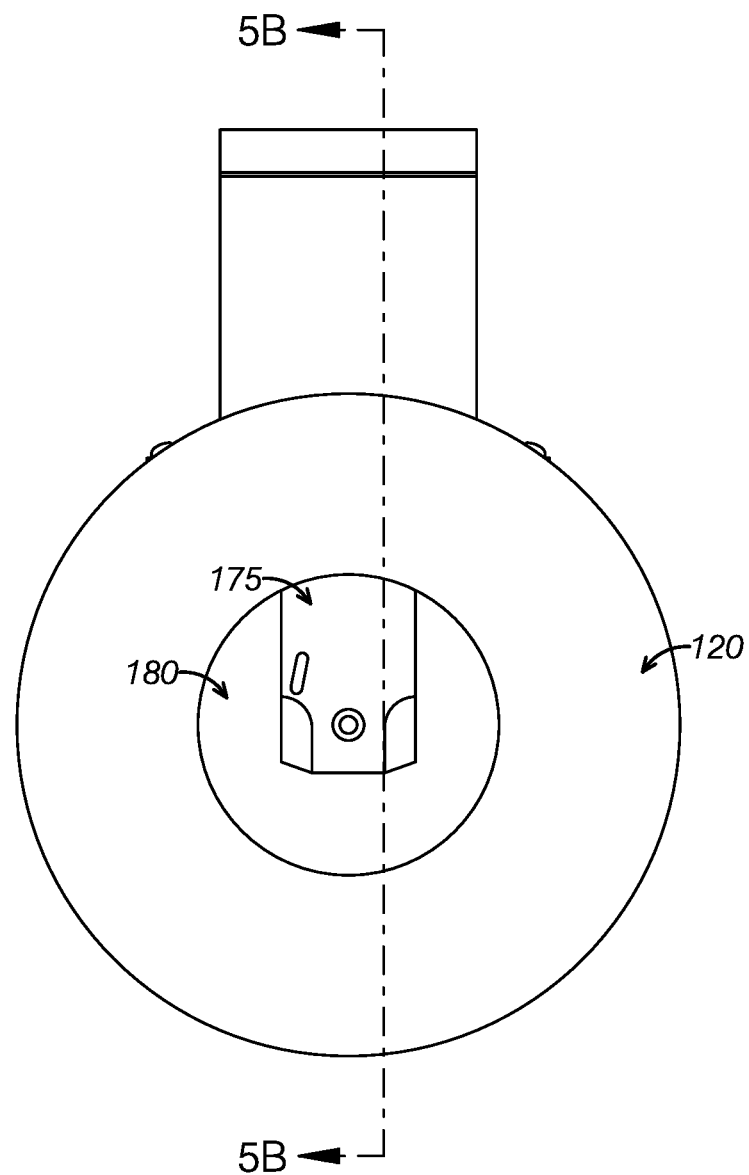
FIG. 5A is an end view of the seismic valve shut-off assembly of FIG. 1, in a closed position.
Figure 5B:
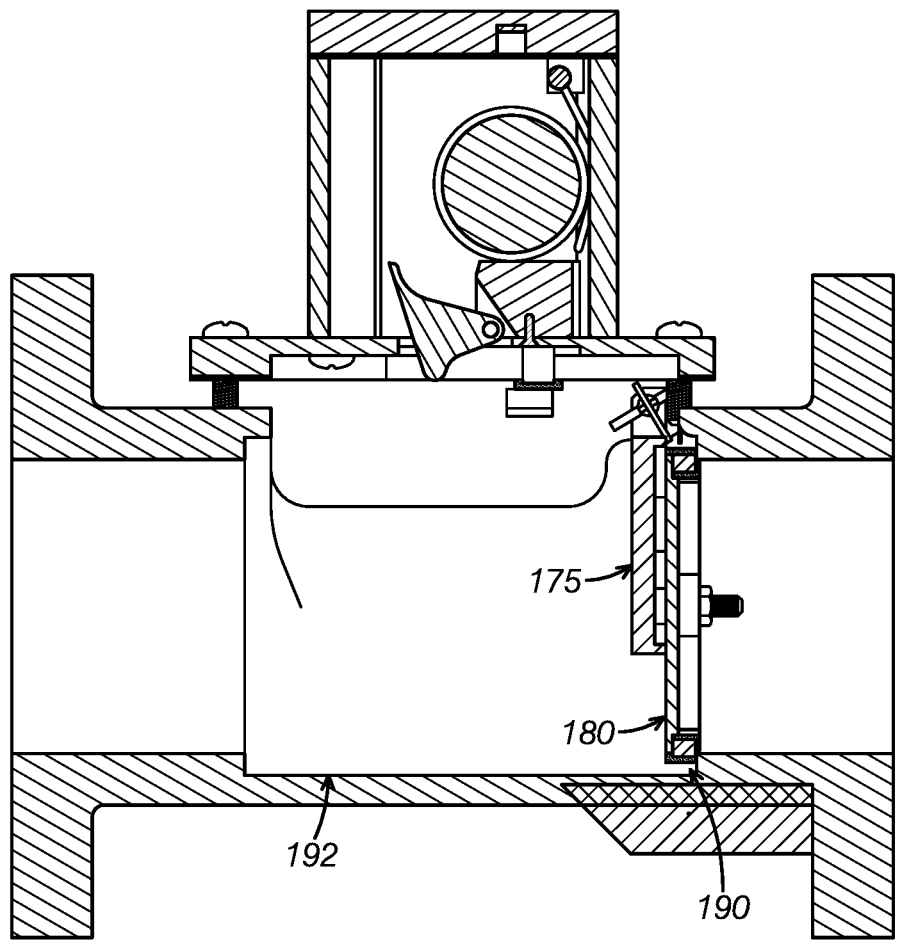
FIG. 5B is a cross-sectional view taken along the line 5*b*-5*b* of FIG. 5*a*.
Figure 6:
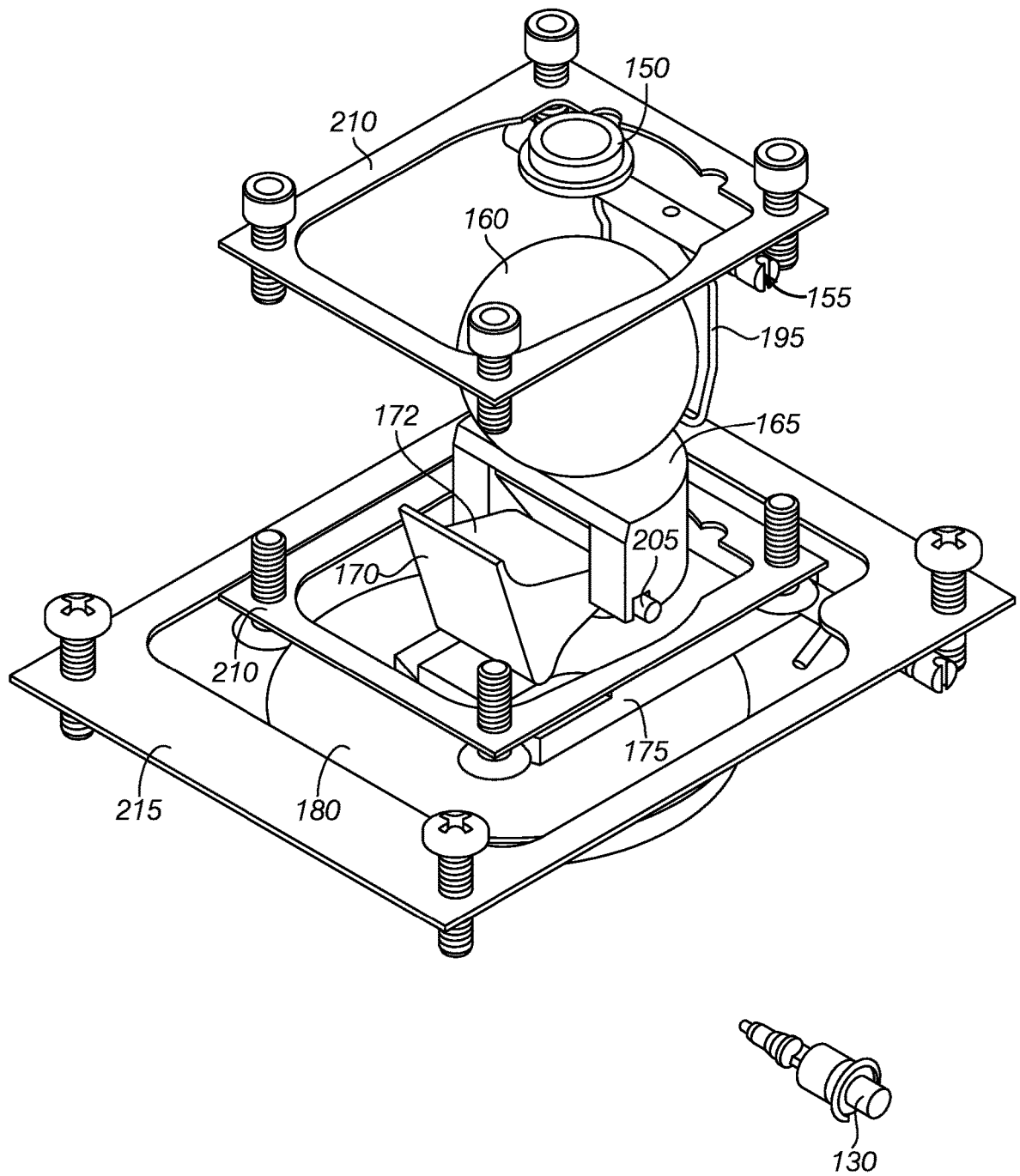
FIG. 6 is an exploded, perspective view of a sensor assembly without a surrounding housing, in accordance with an exemplary embodiment.
Figure 7:
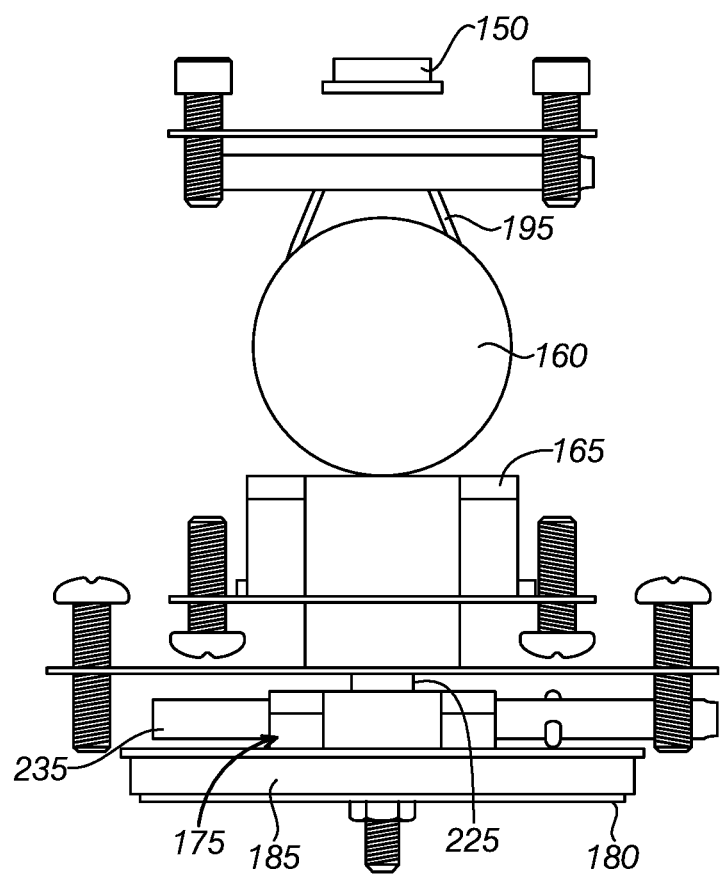
FIG. 7 is a front view of the sensor assembly of FIG. 6.
Figure 7:
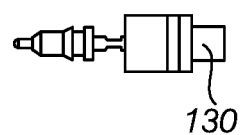
Figure 8:
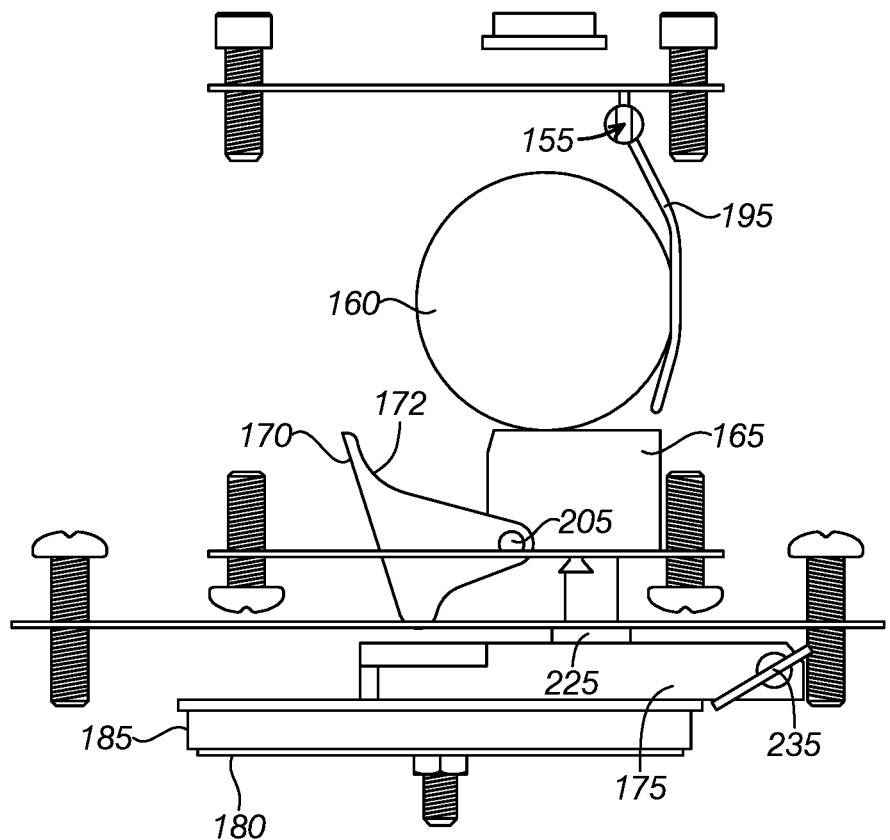
FIG. 8 is a right, side view of the sensor assembly of FIG. 6.
Figure 8:

Referring now to FIGS. 3, 5, 5A, and 5B, internal views of the valve 100 are shown according to an exemplary embodiment. FIGS. 3 and 5 show the valve 100 in the normally open state. FIGS. 5A and 5B show the valve 100 in the closed state.

The passageway 105 includes an inner diameter wall 105a defining the open area of the passageway 105. As best seen in FIG. 5, the valve housing 110 includes a recessed section 192 of the wall 105a in a central portion of the passageway 105 and under the sensor valve housing 140. The recessed section 192 of the wall 105a defines a lip 190 extending from the recessed section of the wall 192 to the inner diameter of the wall 105a. The lip 190 defines a port 194 between the passageway 105 section in respective flanges 120 leading into the interior section of the valve housing 110. For sake of illustration, only one port 194 is described but as can be seen in the drawings, a port 194 may be present on both ends of the valve housing 110.

In an exemplary embodiment, the closing mechanism generally includes a door 180, which in an exemplary embodiment may be a disk. When open, the front face of the door 180 may be perpendicular to the plane of the port 194. As shown, the cross-section of area available for gas flow is completely open since virtually nothing is present within the diameter of the passage 105 in the open state. The door 180 may include a rubber O-ring 185. When triggered, the door 180 may rotate around a shaft 235 and drops into the interior of the valve housing 110, covering the port 194 (FIG. 5A). The O-ring 185 may create a vacuum type seal against the lip 190 (FIG. 5B).

Referring now to FIGS. 3, 5, 5A, and 5B-8, internal views of the trigger mechanism relative to the valve housing 110 are shown according to embodiments. In an exemplary embodiment, the trigger mechanism may be a weight 160 that is disposed to drop onto the door 180 when disturbed from its resting spot by seismic activity. The weight 160 may be a heavy object such as a stainless-steel ball. The weight 160 may be seated onto a platform 165 which detains the weight 160 in equilibrium when seismic vibration activity is below a threshold level. The platform 165 may have a top surface which declines slightly toward gravity. In an exemplary embodiment, the weight 160 may be detained within a shallow, circular well 250 which may be configured to hold, for example, a spherically shaped weight 160. The well 250 may include a depth and radius (based on the radius and weight of the weight 160) that prevents the weight 160 from overcoming a top edge of the well 250 and moving on the platform 165 until a sufficient force causes the momentum of the weight 160 to overcome the physical constraints of the well 250. In an exemplary embodiment, a force registering 5.4 on the Richter scale may cause the weight 160 to displace from the well 250. The top of the platform 165 may be elevated from the door 180. The height of the platform 165 may be based on a force needed to displace the door 180 from its securing mechanism by freefall of the weight 160.

The door 180 may be connected to a flapper 175 which retains the door 180 to a ceiling of the valve housing 110. Details of the flapper 175 can be seen in FIGS. 15-18. In an exemplary embodiment, the flapper 175 may have a ferrous element and a magnet 225 may be attached to the valve housing 110 ceiling holding the flapper 175 up against the ceiling, perpendicular to the plane of the port 194.

In some embodiments, a trigger 170 may be positioned above the flapper 175. A bottom edge of the trigger 170 may abut the top of the flapper 175. The trigger 170 may be connected by a hinge 205 to the bottom of the platform 165. In an exemplary embodiment, the trigger 170 includes a catch 172 for receiving the weight 160 after freefall from the platform 165. The catch 172 may be for example, a curved upper surface indexed to receive and retain ball-shaped weights 160 on impact.

Referring now to FIGS. 5, 5a, 5b, 6-8, and 19-23 triggering of the valve 100 will be described. FIGS. 19-23 show details of a platform 165 according to an exemplary embodiment. In operation, when seismic activity is large enough to move the weight 160 from its seat on the platform 165, the weight 160 will roll off a front edge 245 of the platform 165 and onto the trigger 170. The front edge 245 may be beveled to promote falling off the platform 165. The impact of the falling weight 160 will cause the trigger 170 to force the flapper 175 from its retaining mechanism (for example, its magnetic attraction to the magnet 225). The flapper 175 will be free to drop under the force of gravity about a horizontal axis of the shaft 235, into position sealing the port 194 and interrupting gas flow through the passage 105. The weight 160 may be retained by the curved upper surface 172 which prevents the weight from falling down into the passageway 105.

Some embodiments may include a spring arm 195 positioned proximate the rear of the platform 165, behind the weight 160 (for example, on a side of the platform 165 opposite the platform edge 245). The spring arm 195 may be disposed for actuation to push the weight 160 off the well 250 causing the valve 100 to actuate during a manual operation. For example, the spring arm 195 may be attached to the emergency shut off shaft 155. Operation of the emergency shutoff shaft 155 may trigger the spring arm 195 to launch the weight 160 off the platform 165 onto the door 180. The emergency shut off shaft 155 may be under tension so that the shaft 155 will return to its starting position after being turned.

A technician or other user may check to see if the valve 100 is closed by peering through the sight glass 150. If the weight 160 is on the trigger 170, then this is a visible indicator that the valve 100 is closed. The reset button 135 may be activated which operates the reset shaft 235 which lifts the flapper 175 up to the open position. This is done by pins that run through the shaft 235 and when the shaft 235 is turned, the pins push against the flapper 175 lifting it up. When the valve 100 is reset, the flapper 175 may be lifted up. The flapper 175 may push against the trigger 170 (which is holding the weight 160). As the trigger 170 raises upward by the force of the flapper 175, the weight 160 may be lifted back over the platform edge 245 and onto the well 250.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements. For example, while the flapper 175 is described as being retained by a magnet, other means of holding the flapper 175 in place may be used such as a spring, a latch, suction, etc. In addition, while the weight 160 was described as a ball, other shaped objects may be used and moved from the platform 165.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense, it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a sub combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

Terms such as "top," "bottom," "front," "rear," "above," "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Similarly, an item disposed above another item may be located above or below the other item along a vertical, horizontal or diagonal direction; and an item disposed below another item may be located below or above the other item along a vertical, horizontal or diagonal direction.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A seismically activated gas shut-off valve assembly, comprising:
    a gas flow passageway defined by a conduit wall;
    a port in the gas flow passageway;
    a platform positioned above the gas flow passageway;
    a door positioned below the platform;
    a retention mechanism positioned above the door, outside of the gas flow passageway, the retention mechanism retaining the door in a first position, wherein a front face of the door, while the door is in the first position, is perpendicular to the port in the gas flow passageway and the door is normally open and outside the gas flow passageway permitting gas to flow through the passageway, the door having a first surface, facing the gas flow passageway when the door is in the first position, and a second surface, opposite the first surface;
    a trigger mechanism positioned below the platform and above the door;
    a catch surface on the trigger mechanism, wherein the catch surface comprises a curved top surface on the trigger mechanism;
    a weight positioned in equilibrium on the platform, wherein, in response to a seismic vibration above a threshold level, the weight is displaced from equilibrium falling off the platform and onto the catch surface of the trigger mechanism, wherein the trigger mechanism is disposed to dislodge the door positioned below the platform from the normally open first position in response to an impact from the weight falling on the trigger mechanism and the trigger mechanism providing a force on the second surface of the door, the force solely and directly dislodging the retention mechanism from the door, releasing the door to move about a horizontal axis and into a second position parallel to the port and sealing the port putting the valve assembly into a closed state, preventing gas flowing through the passageway, wherein the curved top surface is configured to retain the ball on impact and prevent the ball from falling into the gas flow passageway.

2. The gas shut-off valve assembly of claim 1, wherein the retention mechanism is a magnet.

3. The gas shut-off valve assembly of claim 2, further comprising a flapper coupled to the door, wherein the magnet attracts the door into the first position.

4. The gas shut-off valve assembly of claim 1, wherein the weight is a metal ball.

5. The gas shut-off valve assembly of claim 1, further comprising a lip on an inner diameter of the gas flow passageway, wherein the door first position is perpendicular to a plane of the lip and the door second position is parallel to the plane of the lip.

6. The gas shut-off valve assembly of claim 5, further comprising an O-ring on the door, wherein the O-ring is configured to seal the port in the door second position.

7. The gas shut-off valve assembly of claim 1, further comprising a spring arm positioned behind the weight while the weight is in equilibrium on the platform.

8. The gas shut-off valve assembly of claim 1, wherein the force is applied to the door at a position distal the retention mechanism, relative to the horizontal axis about which the door moves.

9. A seismically activated gas shut-off valve assembly, comprising:
    a gas flow passageway defined by a conduit wall;
    a port in the gas flow passageway;
    a platform positioned above the gas flow passageway;
    a door positioned below the platform, the door having a first surface, facing the gas flow passageway when the door is in the first position, and a second surface, opposite the first surface;
    a trigger mechanism pivotable about an axis, the trigger mechanism positioned below the platform and above the door;
    a retention mechanism positioned above the door, outside of the gas flow passageway, the retention mechanism retaining the door in a first position and outside an inner diameter of the conduit wall, wherein a front face of the door, while the door is in the first position, is perpendicular to the port in the gas flow passageway and the door is normally open and outside the gas flow passageway permitting gas to flow through the passageway; and
    a weight positioned on the platform, wherein, in response to a seismic vibration above a threshold level, the weight is displaced off a front edge of the platform, onto the trigger mechanism to pivot the trigger mechanism to provide a force onto the second surface of the door positioned below the platform, the force dislodging the retention mechanism from the door, wherein an impact from the weight on the trigger mechanism solely and directly disengages the door from the retention mechanism, releasing the door to move about a horizontal axis and into a second position into the gas flow passageway sealing the port and putting the valve assembly into a closed state, preventing gas flowing through the passageway.

10. The gas shut-off valve assembly of claim 9, further comprising a catch surface on the trigger mechanism, wherein the catch surface is configured to retain the weight on impact and prevent the weight from falling into the gas flow passageway.

11. The gas shut-off valve assembly of claim 10, wherein:
the weight is a metal ball; and\
the catch surface is a curved top surface of the trigger mechanism, wherein the curved top surface is configured to retain the ball on impact and prevent the ball from falling into the gas flow passageway.

12. The gas shut-off valve assembly of claim 9, further comprising a lip on an inner diameter of the gas flow passageway, wherein the door first position is perpendicular to a plane of the lip and the door second position is parallel to the plane of the lip.

13. The gas shut-off valve assembly of claim 12, further comprising an O-ring on the door, wherein the O-ring is configured to seal against the lip, in the door second position.

14. A seismically activated gas shut-off valve assembly, comprising:
a gas flow passageway defined by a conduit wall;
a platform positioned above the gas flow passageway;
a well in the top surface of the platform;
a door positioned below the platform, the door having a first surface, facing the gas flow passageway when the door is in the first position, and a second surface, opposite the first surface;
a port in the gas flow passageway;
a trigger mechanism pivotable about an axis, the trigger mechanism positioned below the platform and above the door;
a retention mechanism positioned above the door, outside of the gas flow passageway, the retention mechanism retaining the door in a first position, wherein a front face of the door, while the door is in the first position, is perpendicular to the port in the gas flow passageway and the door is normally open permitting gas to flow through the passageway;
a weight positioned in the well of the platform, wherein, in response to a seismic vibration above a threshold level, the weight is displaced from the well and off the platform, onto the trigger mechanism to pivot the trigger mechanism to provide a force onto the second surface of the door positioned below the platform, the force solely and directly dislodging the retention mechanism from the door, wherein an impact from the weight on the trigger mechanism disengages the door from the retention mechanism, releasing the door to move into a second, closed position of the port, preventing gas flowing through the passageway.

15. The gas shut-off valve assembly of claim 14, wherein the door is substantially outside of the gas flow passageway in the first position.

16. The gas shut-off valve assembly of claim 14, further comprising a spring arm positioned behind the weight while the weight is in the well on the platform.

17. The gas shut-off valve assembly of claim 14, further comprising a lip on an inner diameter of the gas flow passageway, wherein the door first position is perpendicular to a plane of the lip and the door second position is parallel to the plane of the lip.

* * * * *